United States Patent
Fischer et al.

(10) Patent No.: US 10,864,887 B2
(45) Date of Patent: Dec. 15, 2020

(54) RETRACTOR PRETENSIONER WITH PISTON REST AREA

(71) Applicant: AUTOLIV DEVELOPMENT AB, Vargarda (SE)

(72) Inventors: Christian Fischer, Hamburg (DE); Markus Furchert, Bokholt-Hanredder (DE)

(73) Assignee: AUTOLIV DEVELOPMENT AB, Vargarda (SE)

( * ) Notice: Subject to any disclaimer, the term of this patent is extended or adjusted under 35 U.S.C. 154(b) by 15 days.

(21) Appl. No.: 16/238,914

(22) Filed: Jan. 3, 2019

(65) Prior Publication Data
US 2019/0217815 A1    Jul. 18, 2019

(30) Foreign Application Priority Data
Jan. 12, 2018 (DE) .................. 10 2018 100 605

(51) Int. Cl.
*B60R 22/46* (2006.01)
*B60R 22/195* (2006.01)

(52) U.S. Cl.
CPC ...... *B60R 22/4633* (2013.01); *B60R 22/1954* (2013.01); *B60R 22/4628* (2013.01); *B60R 2022/4642* (2013.01)

(58) Field of Classification Search
CPC ............................... B60R 22/00–48
See application file for complete search history.

(56) References Cited

U.S. PATENT DOCUMENTS 7,631,900 B2 * 12/2009 Nakayama .......... B60R 22/1952
                                                  280/806
2002/0113425 A1 * 8/2002 Betz .................... B60R 22/1952
                                                  280/806

FOREIGN PATENT DOCUMENTS

DE    10 2009 049 576 A1    4/2011

* cited by examiner

*Primary Examiner* — Laert Dounis
(74) *Attorney, Agent, or Firm* — Dickinson Wright PLLC

(57) ABSTRACT

A seatbelt tensioner for a seat belt retractor, having a pipe (1) with a tensioner drive wheel, a gas generator (10), a piston (3), and at least one mass body (4). The mass body (4) is drivable by gas from the gas generator (10) acting on the piston (3) between the gas generator (10) and a mass body (4). The mass body drives the tensioner drive wheel. The pipe (1) has a receiving section (5) with a first inner diameter (2), in which the piston (3) in its initial state is arranged with an initial-state outer diameter (8). The pipe (1) has a guide section (6) which adjoins the receiving section (5) and which has a second inner diameter (7). The second inner diameter (7) is smaller than the first inner diameter (2) and smaller than the initial-state outer diameter (8) of the piston (3).

12 Claims, 1 Drawing Sheet

RETRACTOR PRETENSIONER WITH PISTON REST AREA

CROSS-REFERENCE TO RELATED APPLICATION

This application claims the benefit of priority under 35 U.S.C. § 119 to German Patent Application No. 10 2018 100 605.5, filed Jan. 12, 2018, the contents of which are incorporated herein by reference in their entirety.

FIELD OF THE INVENTION

The present invention relates to seatbelt tensioner for a seat belt retractor, having a pipe with a tensioner drive wheel, wherein a pyrotechnical gas generator, a piston, and at least one mass body are arranged in the pipe, wherein the at least one mass body is drivable by the pressure generable by the gas generator and acting on the piston arranged between the gas generator and a mass body, and which can be made to mesh in a force-transmitting manner with the tensioner drive wheel, when exiting the pipe, thus driving a belt shaft of the seat belt retractor in a tensioning direction that coils (retracts) a safety belt. The pipe has a receiving section with a first inner diameter, in which the piston in its initial state is arranged with an initial-state diameter prior to the ignition of the gas generator.

BACKGROUND

A seatbelt tensioner with the aforementioned features is known from DE 10 2009 049 576 A1. In order to seal the piston against the inner surface of the pipe, the piston, prior to installation in the pipe, has an outer diameter which is greater than the first inner diameter of the receiving section of the pipe. During installation, the piston is pressed into the receiving section of the pipe, thus radially deforming the piston both elastically and plastically. It has become apparent that the force transmission of the mass bodies to the tensioner drive wheel during the tensioning process may be uneven, particularly, when the seatbelt tensioner is triggered after a long period of a time and after temperature fluctuations.

Therefore, the problem addressed by the present invention is that of addressing the disadvantages described with regard to the prior art, and to provide a seatbelt tensioner, in which the force transmission of the mass bodies to the tensioner drive wheel is more uniform even long after installation.

SUMMARY AND INTRODUCTORY DESCRIPTION OF INVENTION

The above-described problem is addressed by a seatbelt tensioner described herein.

The problem is particularly solved by a seatbelt tensioner with the initially described features, in which the pipe has a guide section which adjoins the receiving section and which has a second inner diameter, by which the piston is driven after the ignition of the gas generator, wherein the second inner diameter is smaller than the first inner diameter and smaller than the initial-state outer diameter of the piston.

As one feature, the described embodiments of the invention thus provides that the pipe with the receiving section has an area, in which the piston is not or only very slightly plastically deformed after installation, and that the piston, in case of triggering, is moved by the pressurized gas into the guide section of the pipe, in which the piston, due to the second inner diameter which is smaller with respect to the first initial-state outer diameter, sealingly bears against the inner surface of the pipe with a relatively high radial force. Since the piston is not plastically deformed after installation, the piston bears in the guide section more reliably against the inner wall of the pipe. As a result, the pressurized gas is prevented from escaping around the piston, when the piston is driven by the guide section. In addition, the sealing between the piston and pipe and thus also the force transmission to the tensioner drive wheel is evened out.

In an embodiment of the present invention, the first inner diameter can be greater that the outer circumferential diameter of the piston prior to its installation. However, the first inner diameter is preferably the same size as the outer circumferential diameter of the piston not yet installed. However, it can also be provided that the first inner diameter is no more than 0.4 mm, preferably no more than 0.2 mm, smaller than the outer diameter of the piston prior to its installation. In such case, the piston, after installation is deformed predominantly elastically, and plastically, if at all, only to a minimal extent.

The second inner diameter is particularly at least 2%, and preferably at least 3%, smaller than the first inner diameter. In absolute values, the second inner diameter is at least 0.2 mm, and preferably at least 0.4 mm, and particularly preferably at least 0.6 mm smaller than the first inner diameter.

In order to ensure that the piston during the transition from the receiving section to the guide section bears evenly against the inner side of the pipe, a run-up slope is preferably formed on the inner side of the pipe forming a transition section between the receiving section and the guide section, in which the inner diameter of the pipe evenly diminishes along the extension direction of the pipe. This transition section has particularly a length of no more than 10 mm, and preferably of no more than 5 mm.

Since the piston is arranged in the receiving section in an easily movable manner, a rattle prevention of the seatbelt tensioner can be realized more easily. For that purpose, the piston in its initial state bears against a spring which is arranged particularly between gas generator and piston and pretensions the piston in the direction of the mass bodies. In addition, the mounting forces are also reduced.

Particularly on its rear side, which faces away from the mass bodies, the piston has a radially projecting sealing lip which bears against the inner side of the pipe. Such a piston is known, for example, from DE 10 2009 049 576 A1.

BRIEF DESCRIPTION OF THE DRAWINGS

In the following, the invention and the technical environment shall be described by way of example using the drawings.

DETAILED DESCRIPTION

Figure 1:
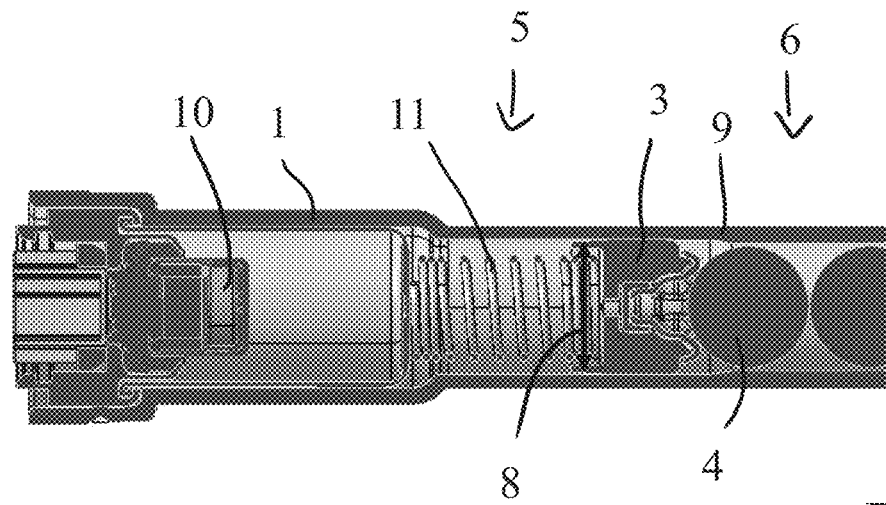
FIG. 1 shows schematically a part of a seatbelt tensioner.
Figure 2:
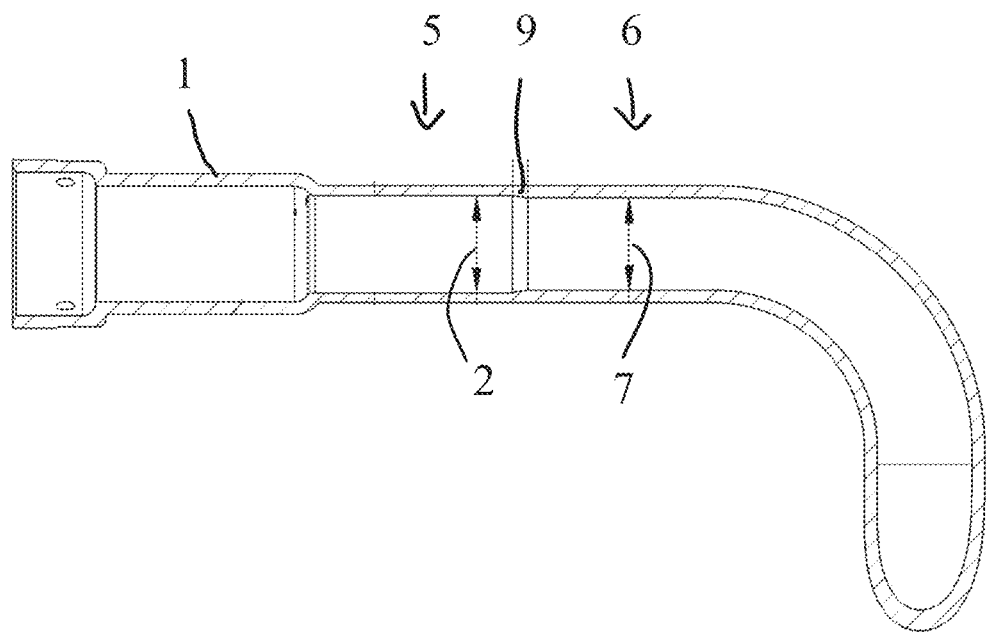
FIG. 2 shows schematically a cross-sectional view through a pipe of the seatbelt tensioner.

The drawings show a part of a pipe 1 of a seatbelt tensioner (also known as a pretensioner). The pipe 1 forms a receiving section 5 with a first inner diameter 2 and an adjoining guide section 6 with a second diameter 7. A run-up slope 9 is formed as a transition between the receiving section 5 and the guide section 6.

At the end shown on the left in the drawings, a gas generator 10 is arranged in the pipe 1. In the initial state, a piston 3, having an initial-state outer diameter 8, is arranged in the receiving section 5. In the direction of the gas generator 10, the piston 3 is supported by a spring 11. On the side of the piston 3, which lies opposite of the gas generator 10, mass bodies 4 are arranged. In case of triggering, the piston 3 is driven by the pressurized gas generated by the gas generator 10, and as a result, the mass bodies 4 are moved through the pipe 1.

The first inner diameter 2 essentially corresponds to the outer diameter of the piston 3, before it was installed in the receiving section 5. In its initial state, the piston 3 is thus radially not plastically deformed. Since the second inner diameter 7 is smaller than the first inner diameter 2 and smaller than the initial-state outer diameter 8 of the piston 3, the piston 3 bears against the inner side of the guide section 6 in a reliably sealing manner, when entering and passing through the guide section 6, and so an even force transmission from the mass bodies 4 exiting the pipe 1 to a tensioner drive wheel is provided.

In this description the tensioner is described as including mass bodies 4. However, other forms of driving mechanisms for a pretensioner known in accordance with the prior art can be provided such as an elongated rod made of a polymeric plastic material or other driving mechanisms. Furthermore, the first internal diameter 2 is described as corresponding to the outer diameter of the piston 3 before it is installed in the receiving section 5. However, it should be noted that a primary feature is a reduction in diameter between diameter 2 and diameter 7, with diameter 7 providing enhanced sealing between the piston 3 and the guide section 6.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt tensioner for a seatbelt retractor, comprising, a pipe with a tensioner drive wheel, wherein a pyrotechnical gas generator, a piston, and at least one mass body are arranged in the pipe, wherein the at least one mass body is drivable by a pressure generable by the gas generator and acting on the piston arranged between the gas generator and the at least one mass body, and which can be made to mesh in a force-transmitting manner with the tensioner drive wheel, when exiting the pipe, thus driving a belt shaft of the seatbelt retractor in a tensioning direction that retracts a seatbelt, further comprising, the pipe has a receiving section with a first inner diameter, in which the piston having an initial-state outer diameter before installation into the receiving section is arranged in the receiving section prior to an ignition of the gas generator, the pipe has a guide section which adjoins the receiving section and which has a second inner diameter, within which the piston is driven after the ignition of the gas generator, wherein the second inner diameter is smaller than the first inner diameter and smaller than the initial-state outer diameter of the piston.

2. The seatbelt tensioner according to claim 1 further comprising, a run-up slope is formed on the inner side of the pipe as a transition section between the receiving section and the guide section.

3. The seatbelt tensioner according to claim 1 further comprising, the piston in an initial state bears against a spring.

4. The seatbelt tensioner according to claim 1 further comprising, the second inner diameter is 2% smaller than the first inner diameter.

5. The seatbelt tensioner according to claim 1 further comprising, the second inner diameter is 3% smaller than the first inner diameter.

6. The seatbelt tensioner according to claim 1 further comprising, the second inner diameter is at least 0.2 mm smaller than the first inner diameter.

7. The seatbelt tensioner according to claim 1 further comprising, the second inner diameter is at least 0.4 mm smaller than the first inner diameter.

8. The seatbelt tensioner according to claim 1 further comprising, the second inner diameter is at least 0.6 mm smaller than the first inner diameter.

9. The seatbelt tensioner according to claim 1 further comprising, the first inner diameter is no more than 0.2 mm smaller than the initial-state outer diameter of the piston.

10. The seatbelt tensioner according to claim 1 further comprising, the first inner diameter is no more than 0.4 mm smaller than the initial-state outer diameter of the piston.

11. The seatbelt tensioner according to claim 2 further comprising, the transition section has a length of 10 mm or less.

12. The seatbelt tensioner according to claim 2 further comprising, the transition section has a length of 5 mm or less.

* * * * *